Figure 11:
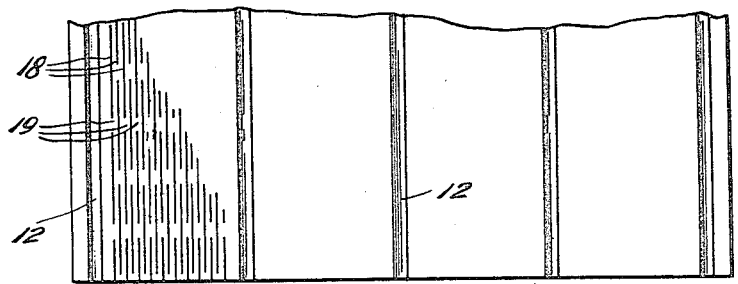

Oct. 30, 1923.
H. M. NAUGLE ET AL
1,472,769
EXPANDED METAL MANUFACTURE
Filed April 16, 1921    12 Sheets-Sheet 1
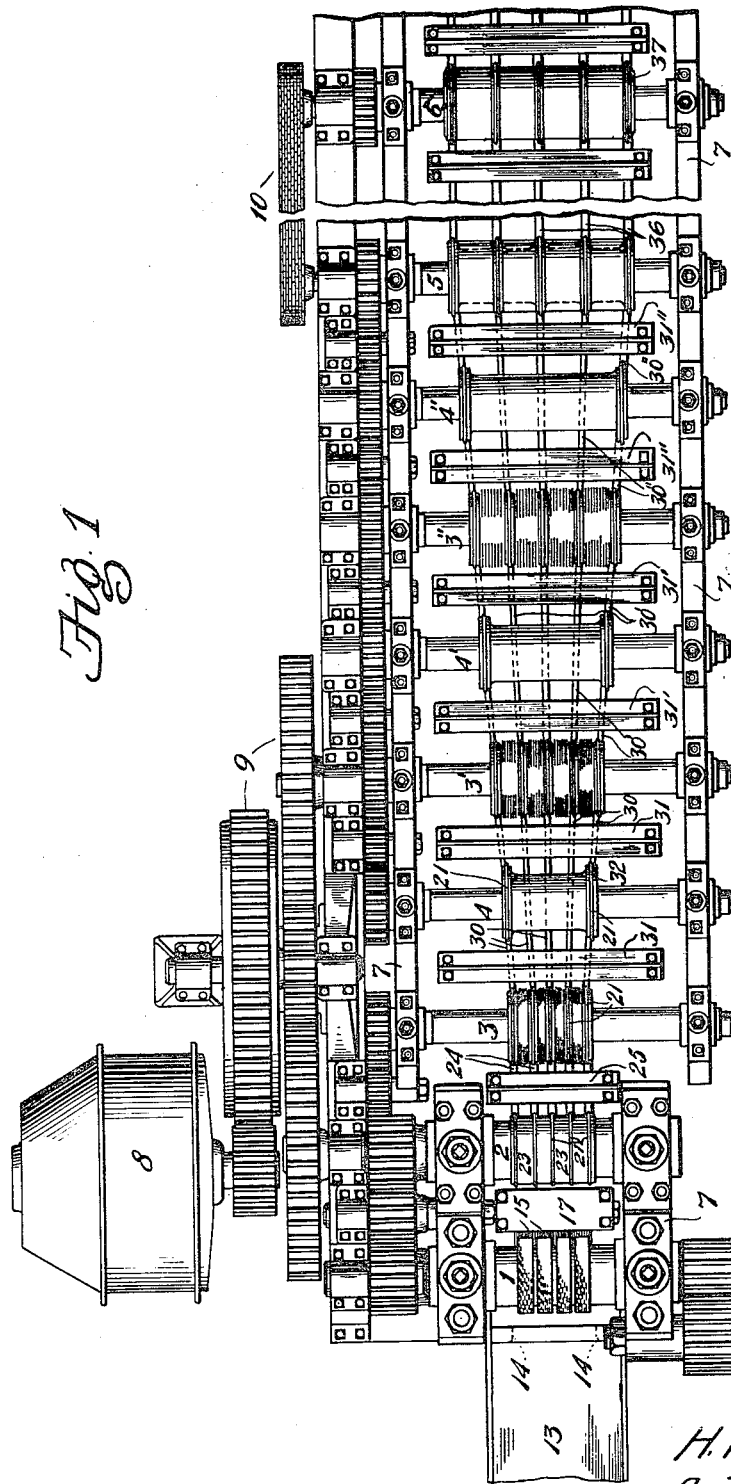
INVENTOR
H. M. Naugle and
A. J. Townsend
BY Trease, Merkel, Synnell and Boyd
ATTYS.

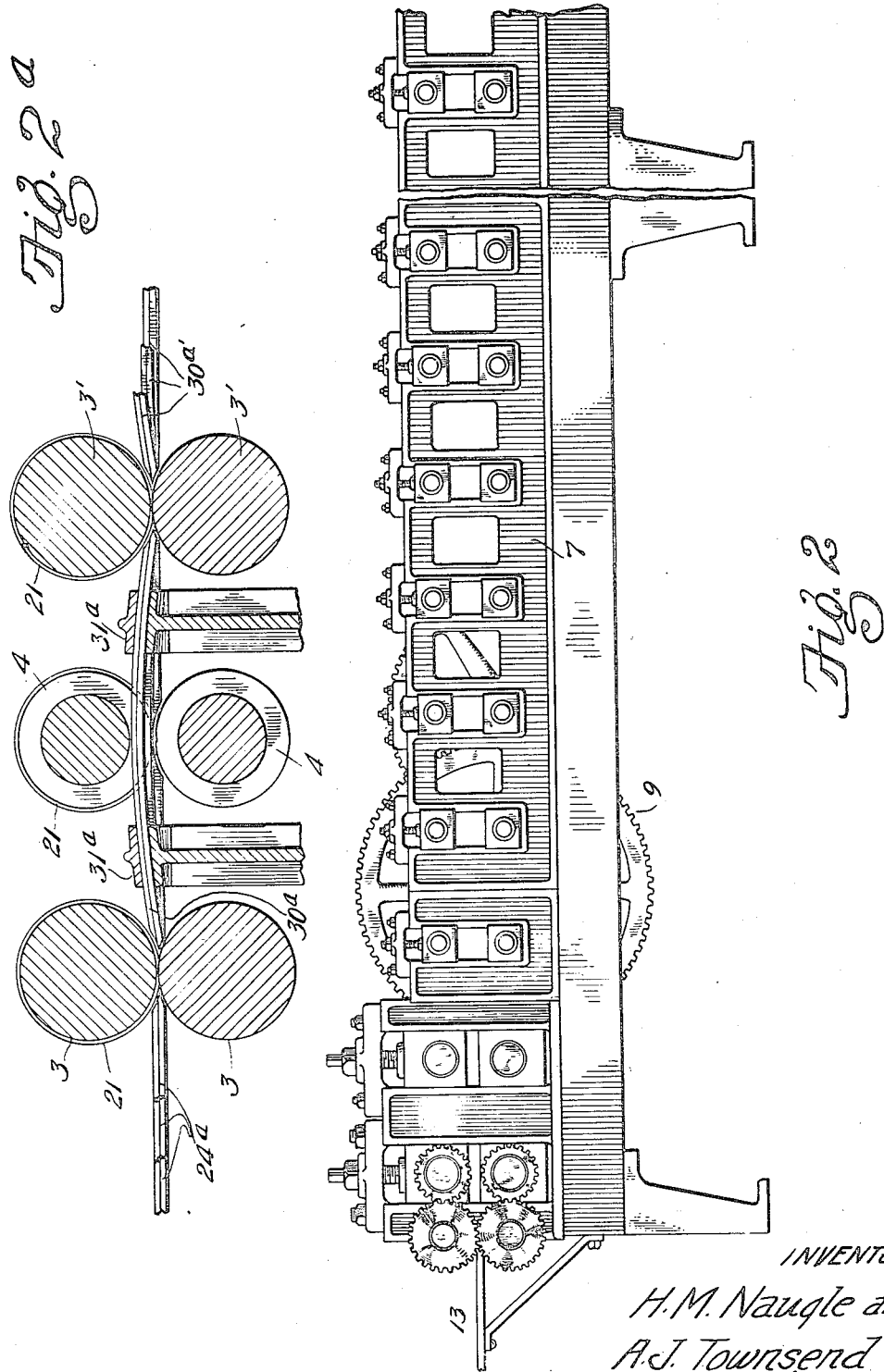

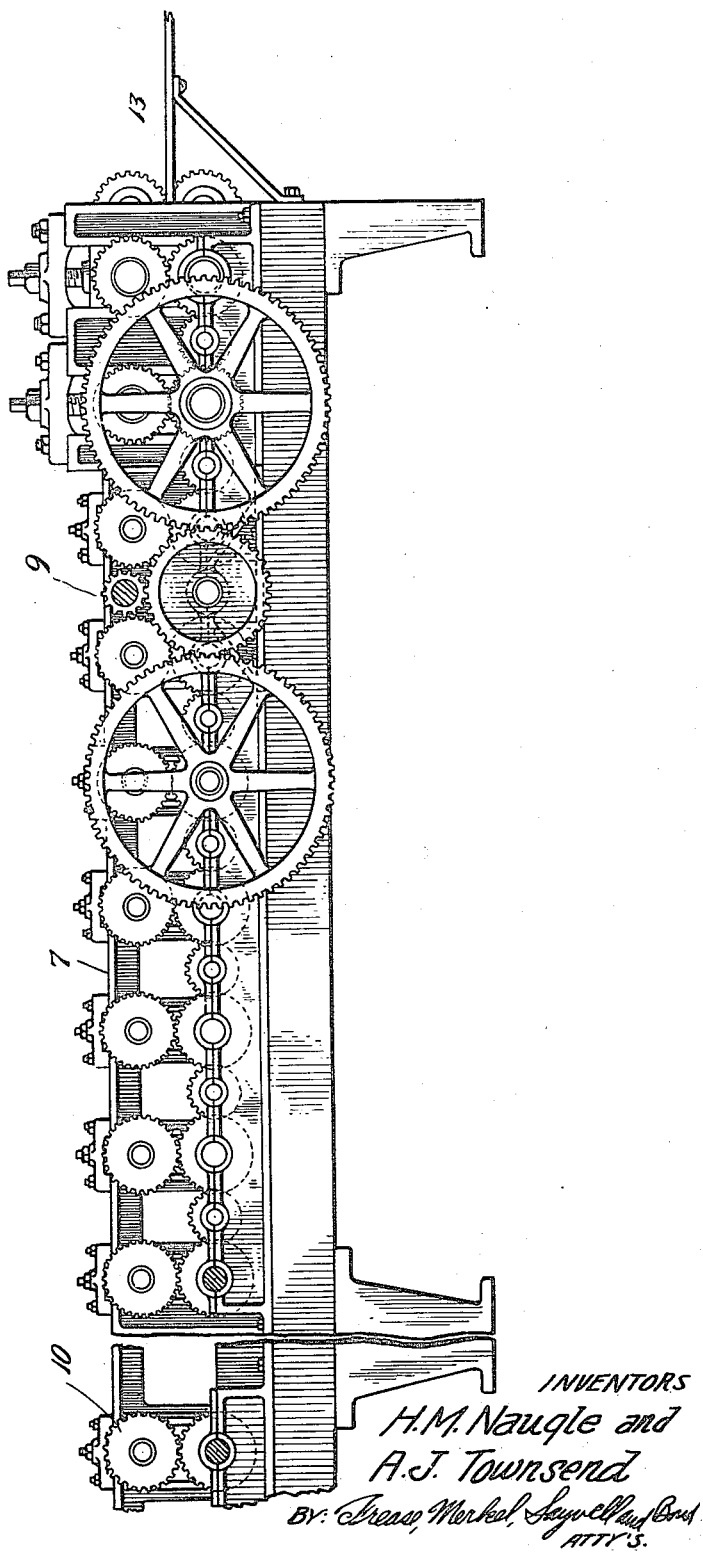

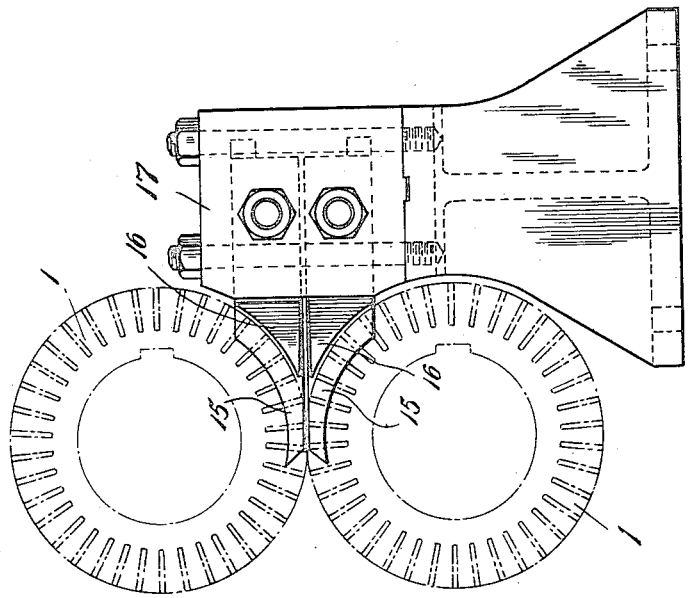
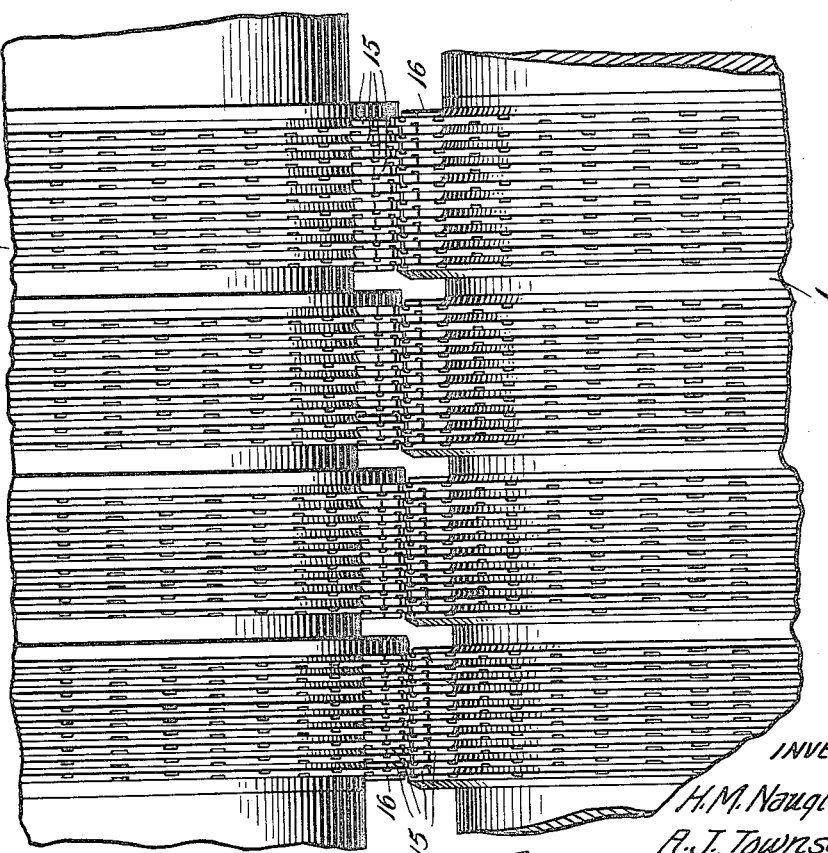

Oct. 30, 1923.
H. M. NAUGLE ET AL
1,472,769
EXPANDED METAL MANUFACTURE
Filed April 16, 1921     12 Sheets-Sheet 5
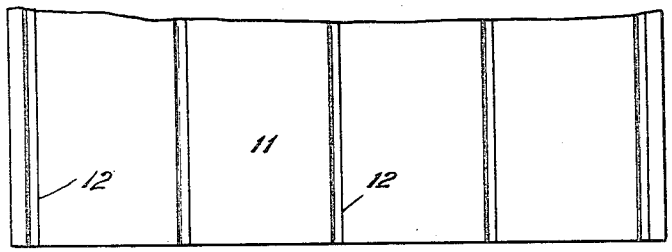
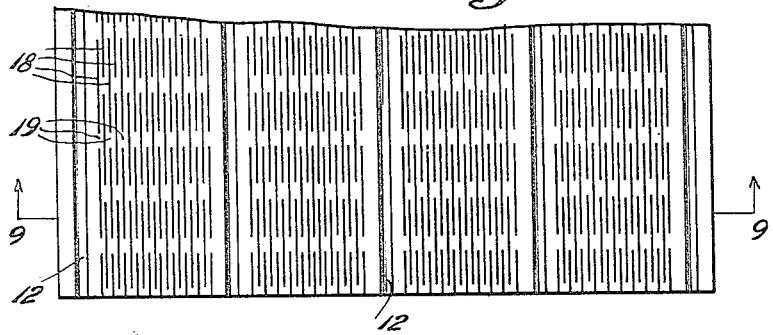
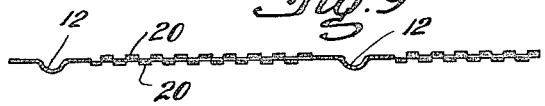
INVENTORS
H. M. Naugle and
A. J. Townsend
BY: *Reese, Merkel, Saywell and Bond*
ATTYS.

Oct. 30, 1923.

H. M. NAUGLE ET AL 1,472,769

EXPANDED METAL MANUFACTURE

Filed April 16 1921    12 Sheets-Sheet 6

INVENTORS
H. M. Naugle and
A. J. Townsend
BY: Freese, Merkel, Saywell and Gard
ATTYS.

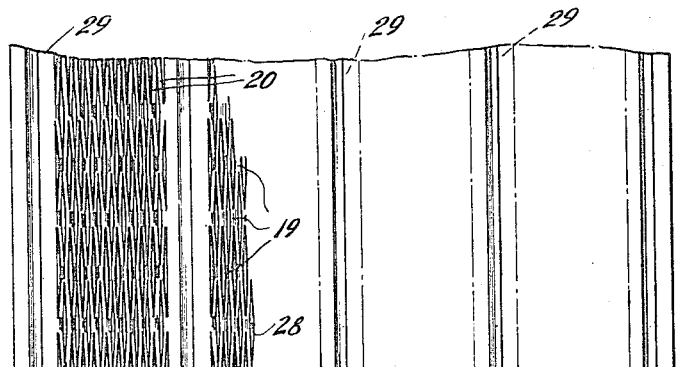
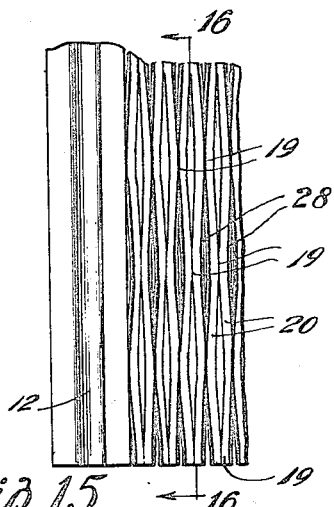
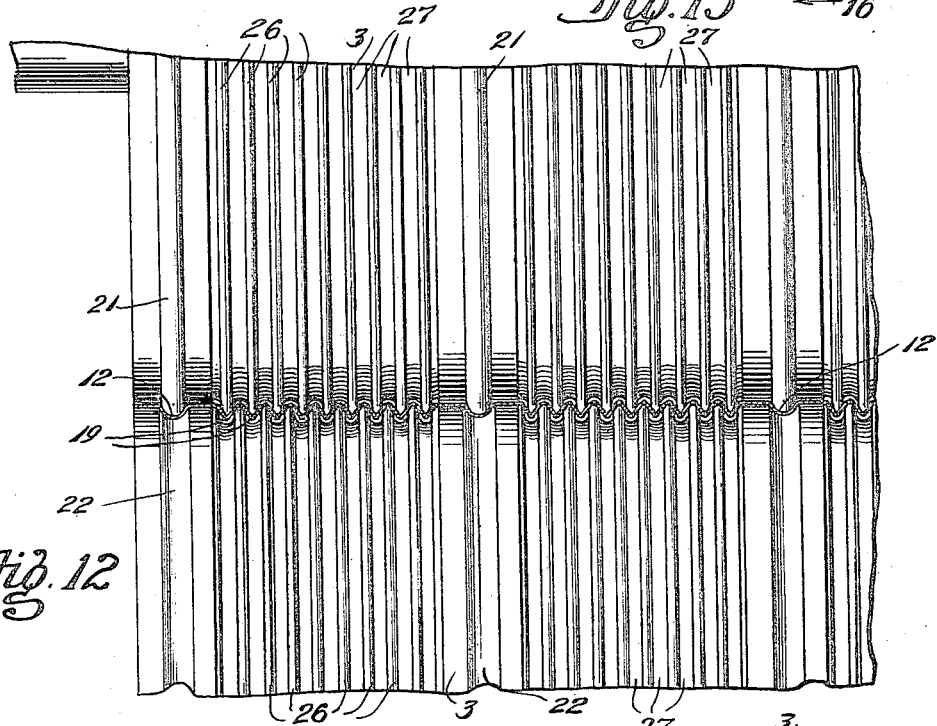
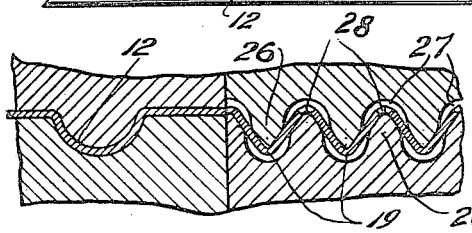

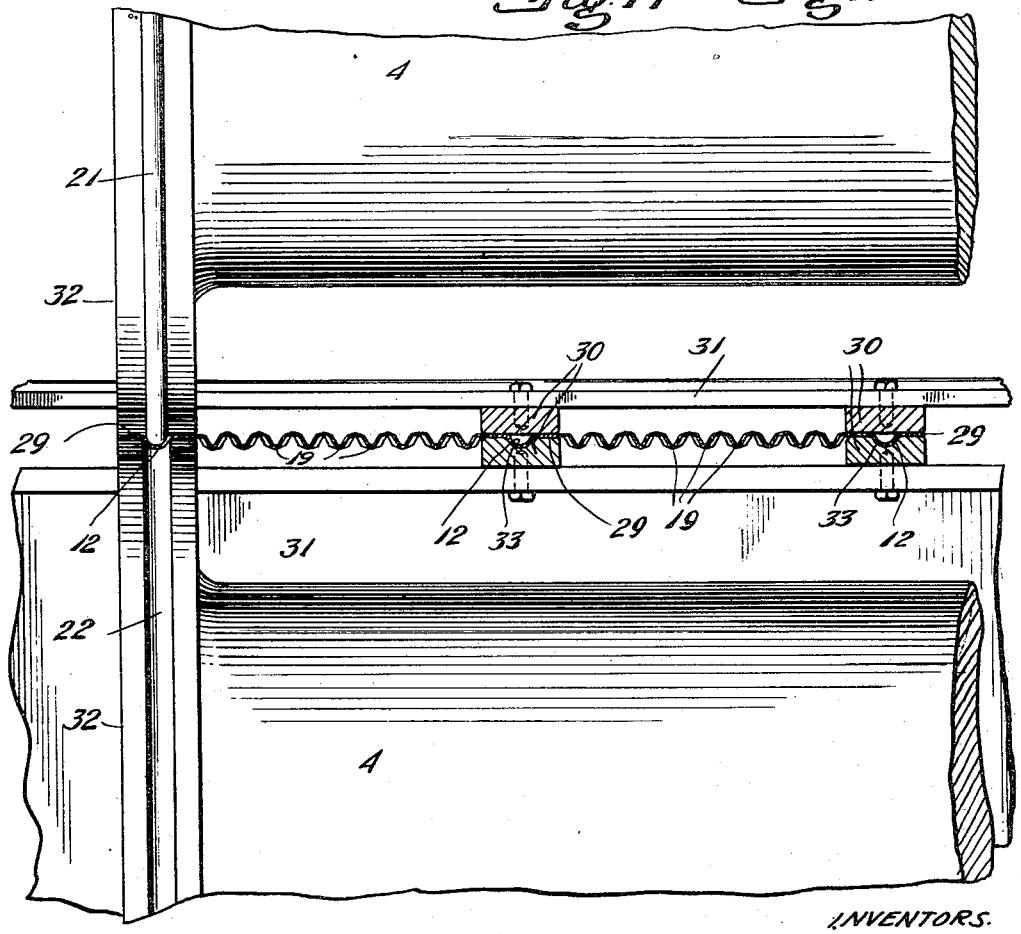

Oct. 30, 1923. 1,472,769
H. M. NAUGLE ET AL
EXPANDED METAL MANUFACTURE
Filed April 16 1921 12 Sheets-Sheet 9
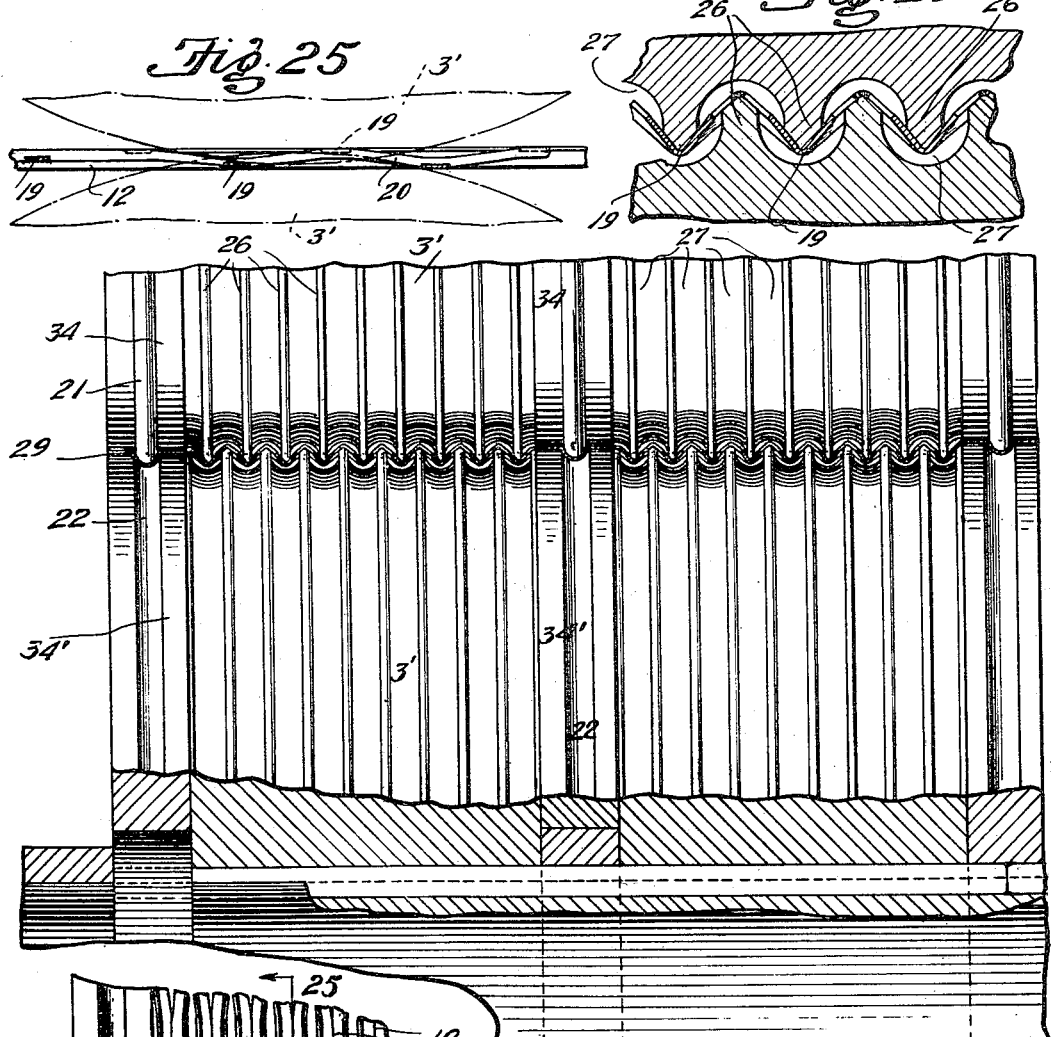

Oct. 30, 1923.

H. M. NAUGLE ET AL

EXPANDED METAL MANUFACTURE

Filed April 16, 1921   12 Sheets—Sheet 10

1,472,769

INVENTORS.
H. M. Naugle and
A. J. Townsend
BY: Freasy, Merkel, Saywell and Bond
ATTYS.

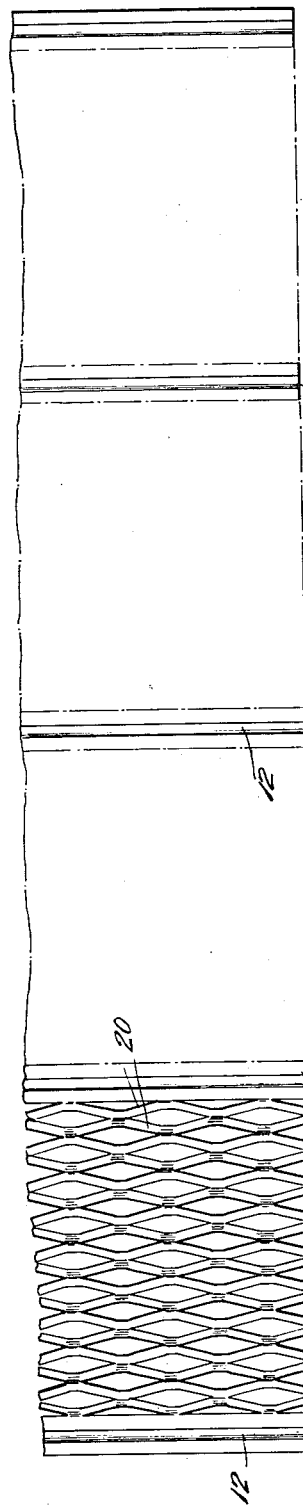
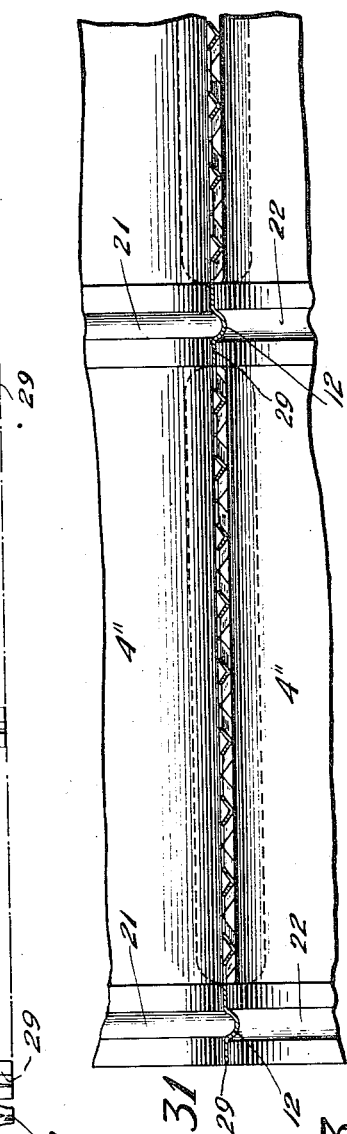
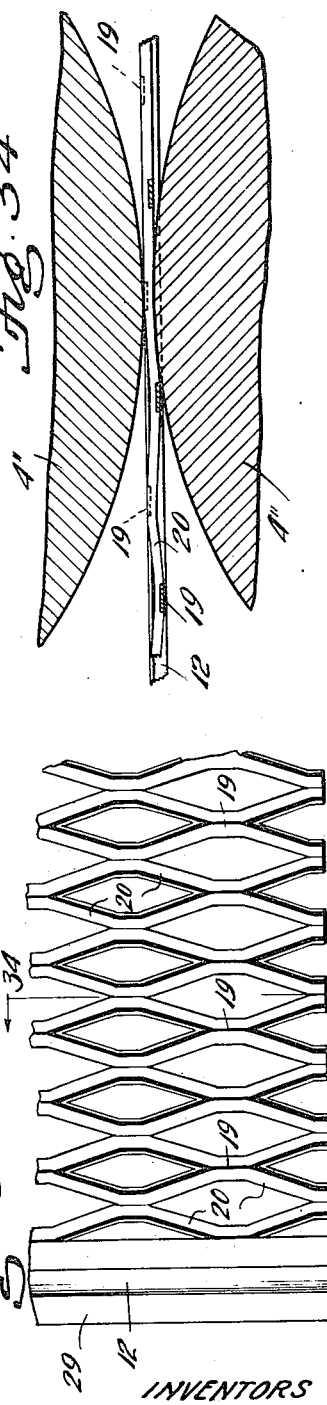

Oct. 30, 1923.
H. M. NAUGLE ET AL
1,472,769
EXPANDED METAL MANUFACTURE
Filed April 16, 1921   12 Sheets-Sheet 12
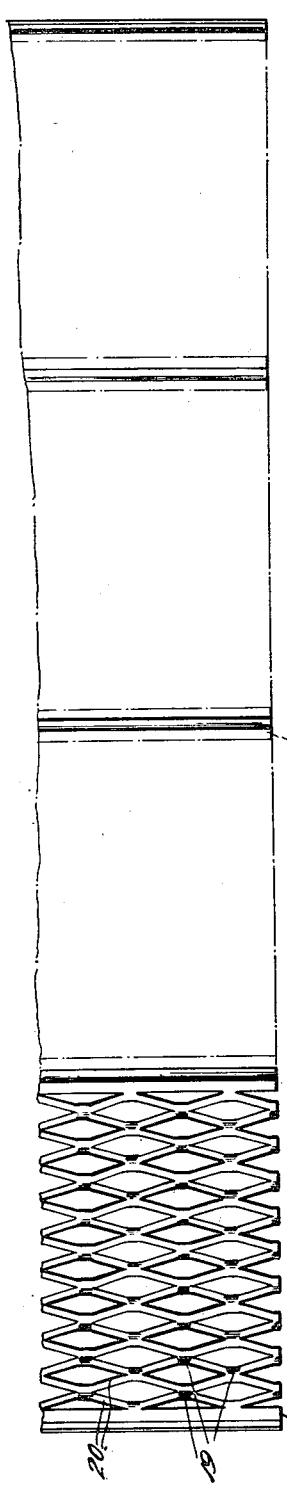
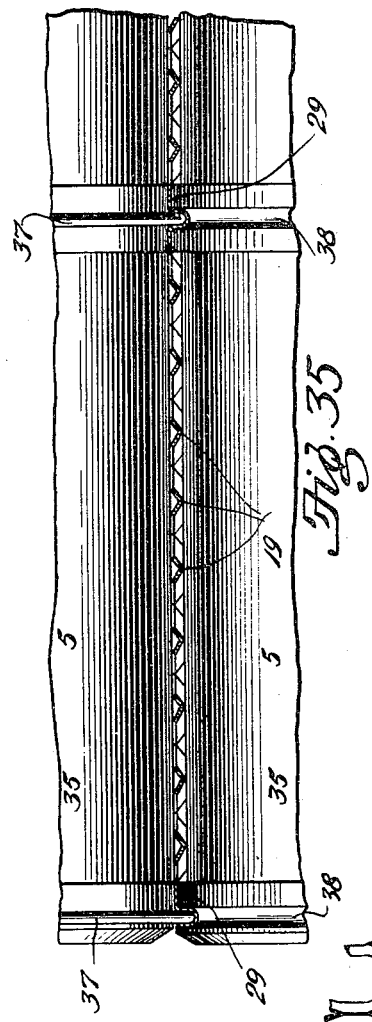
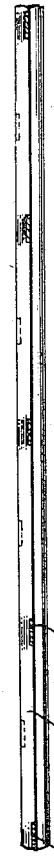
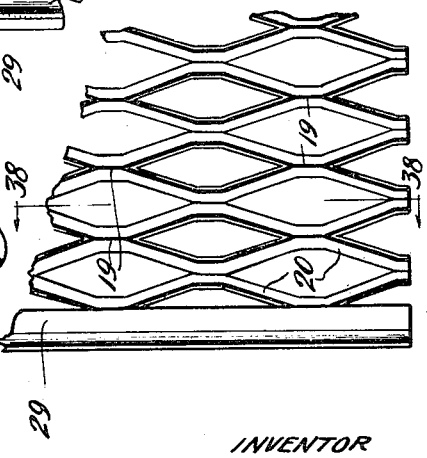
INVENTOR
H. M. Naugle and
A. J. Townsend
BY Dream, Merkel, Saywell and Bond
ATTYS.

Patented Oct. 30, 1923.

1,472,769

UNITED STATES PATENT OFFICE.

HARRY M. NAUGLE AND ARTHUR J. TOWNSEND, OF CANTON, OHIO.

EXPANDED-METAL MANUFACTURE.

Application filed April 16, 1921. Serial No. 461,806.

*To all whom it may concern:*

Be it known that we, HARRY M. NAUGLE and ARTHUR J. TOWNSEND, citizens of the United States, residing at Canton, in the county of Stark and State of Ohio, have invented a new and useful Improvement in Expanded-Metal Manufacture, of which the following is a specification.

The invention relates to methods and apparatus for making expanded metal, with corrugated bonds, stretched strands, and diamond meshes, and with or without ribbed strips. The object of the improvement is to perform the operations of cutting the slits, corrugating the bonds, stretching the strands, expanding the meshes, and forming the ribs, by a single continuous movement of the material, and without shortening or distorting the sheets or the ribs.

The making of expanded metal by a stretching of the strands for producing a diamond shaped mesh without shortening the sheets is attained with many difficulties, which are increased by the use of continuous methods and apparatus, and are further complicated when it is sought to form longitudinal ribs between parallel zones of expanded metal.

The primary type of inclined bond, diamond mesh, expanded metal, has been successfully made by expanding the meshes both with and without stretching the strands, and is probably the most extensively used form of non-ribbed expanded metal lath; and a secondary type of corrugated bond, diamond mesh, expanded metal, has likewise been successfully made by expanding the meshes without stretching the strands, which necessarily shortens the sheets and transversely corrugates the same. But the same success has not attended efforts to make sheets of diamond mesh with corrugated bonds and stretched strands, to preserve the original length of the sheets; nor has the same success attended efforts to make either form of diamond mesh with stretched strands, in zones of expanded metal between non-expanded longitudinal strips or ribs.

The present improvement may involve the use of well known means for rolling a series of laterally spaced longitudinally shallow corrugations or grooves, referred to herein as beads, in plain sheets of metal, to serve as guides for the subsequent operations and to initiate the subsequent formation of deeper corrugations or grooves, referred to herein as ribs.

The improvement may also involve the use of ordinary roller means for cutting longitudinal zones of the sheet metal between the beads, to form laterally spaced series of interrupted slits with alternate bonds staggered in transverse alinement.

The cutting of the slits by the shearing action of rolls or other dies, necessarily deflects portions of the strands from the original plane of the sheet, and as experience has shown that subsequent operations for corrugating the bonds, stretching the strands and expanding the meshes may not result in the formation of uniform meshes unless the slit strands are first returned to the plane of the sheet; one novel step of the improvement involves the use of flattening rolls for straightening the deflected strands and smoothing the slit zones to bring all the strands and bonds into the original plane of the sheet before corrugating the bonds.

Experience has also shown that slitted zones of sheet metal cannot be laterally expanded to certainly and safely form the secondary type of corrugated bond diamond mesh, unless the alternate series of bonds are first longitudinally corrugated in reverse directions to give them the transverse V section required for the final product, before the slit metal is laterally expanded; and another novel step of the improvement involves the use of a new form of roller means for longitudinally corrugating the bonds and longitudinally elongating, as well as laterally inclining the strands, as a necessary operation prior to a lateral expansion without a longitudinal shortening of the meshes.

The reverse corrugation of the alternate series of bonds by the new form of roller means is only partially permitted by a separation of the slit side edges of adjacent bonds; and a further novel feature of the improvement resides in the operation of the corrugating rolls which displaces alternate corrugated bonds from a common plane and thereby straight stretches the strands to elongate the same by a longitudinal tension thereof, as distinguished from a lateral bending, or a shearing operation.

The straight stretching and lateral inclination of the strands by the longitudinal corrugation of the bonds leads to a further novel feature of the improvement, which involves a lateral expansion of the meshes without a shortening of the sheet, by laterally deploying the stretched strands and bonds and bringing the corrugated bonds and inclined strands toward a common plane, which operation may somewhat flatten the angle of the corrugations and the inclination of the strands.

The improvement may also involve the use of diverging guides for engaging and laterally separating the guide beads and expanding the slit metal to the extent permitted by the elongation of the strands; and a further novel step of the improvement involves means for driving the beaded strips which are more remote from a direct line at a differentially greater speed than the less remote strips, or preferably, an arching of the more direct guides, so as to complete the expansion of the sheet with all the beaded strips in the same lateral position, and produce an expanded sheet with square ends as well as of the same length as the ordinary sheet.

The initial stretching given to the stands by the operation of longitudinally corrugating the bonds and displacing them from a common plane may be sufficient to accommodate a full lateral expansion of the sheet for certain purposes, but experience has shown that it is not desirable to stretch the strands by a single operation to a sufficient length to accommodate a full lateral expansion of the meshes to the preferred extent for general purposes; and a further novel step of the improvement involves one or more successive operations of corrugating the bonds and stretching the strands, followed by corresponding lateral expansions of the meshes, until the full amount of stretching of the strands and lateral expansion of the meshes is attained for the desired final product.

Each successive corrugating operation displaces or deflects alternate series of bonds from the plane of the intervening series of bonds, and each expanding operation brings the corrugated bonds toward a common plane, but the resiliency of the metal may cause the bonds to spring away from the common plane; and a further novel step in the improvement involves the use of roller means for flattening the expanded mesh to set the corrugated bonds and inclined strands in a common plane, thus materially reducing the thickness of the mesh and smoothing both faces thereof, and also converting all the strands into truss members acting directly in the plane of the expended sheet.

Experience has shown that if the formation of deeper ribs from the shallow beads is carried on while the beaded strips are diverging for the expending operation, there may be a differential in the relative length of the same which further interferes with the production of an expanded sheet with a square end; and another novel feature of the improvement preferably involves a substantial completion of the expanding operation and the separation of the beaded strips to their final position with respect to each other, before beginning the operation of forming deeper ribs from the initial guide beads.

A further novel feature of the improvement involves the use of parallel guides for carrying the beaded strips directly and without divergence to roller means employed to form ribs from the shallow beads; and a final step in the improvement involves the use of one or more successive rollers means for forming ribs from the shallow beads, each preceded by parallel guides; and the step of flattening the meshes may be performed at the same time with the ribbing operation, thereby giving further lateral expansion of the mesh as may be necessary to supply the additional material required for the formation of the ribs.

The accompanying drawings, forming part hereof, illustrate the method and show apparatus for making the improved expanded metal from a blank having five beads and four intervening zones to be slit and expanded.

Referring to the drawings—

Figure 10:
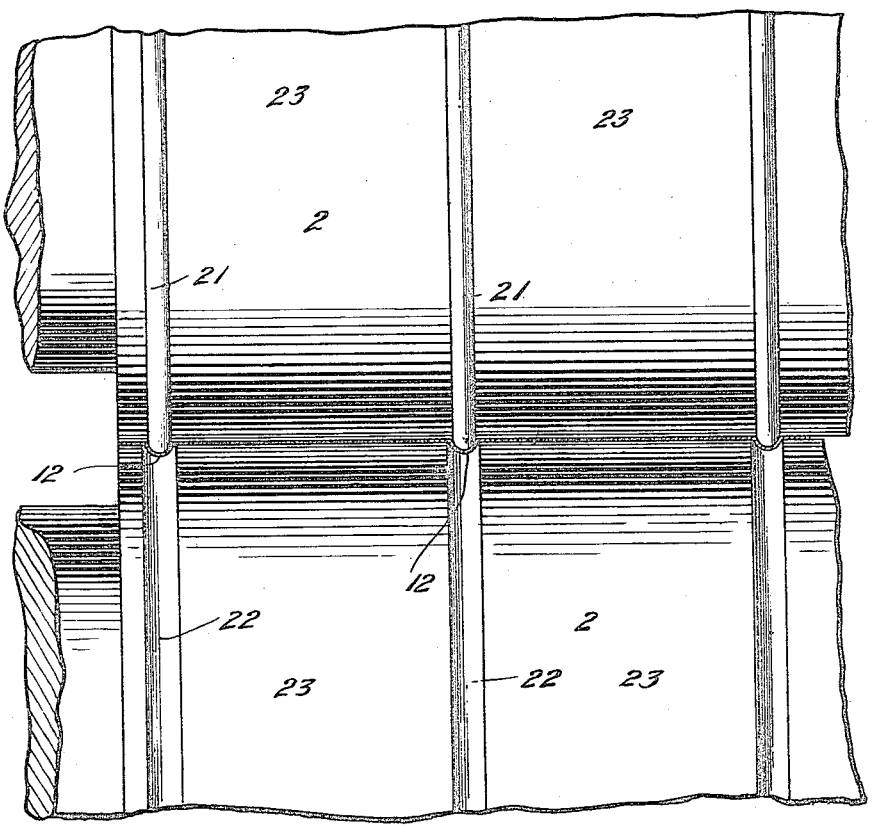
Figure 28:
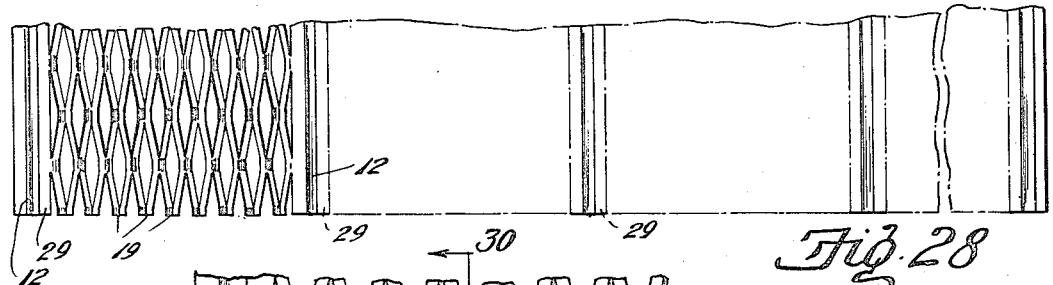
Figure 29:
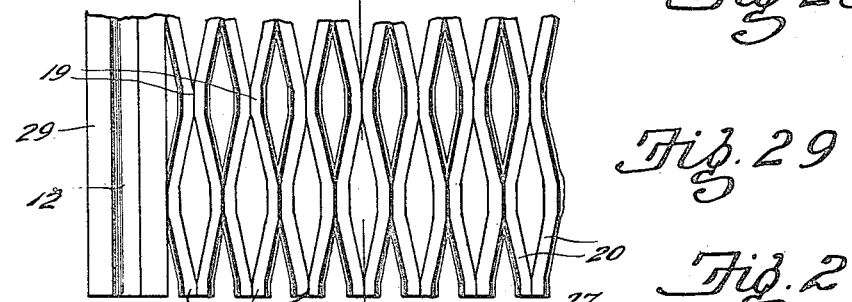
Figure 27:
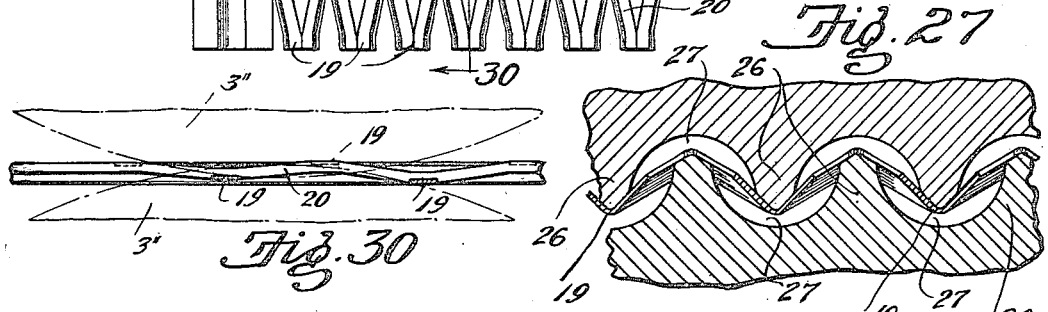
Figure 30:
Figure 26:
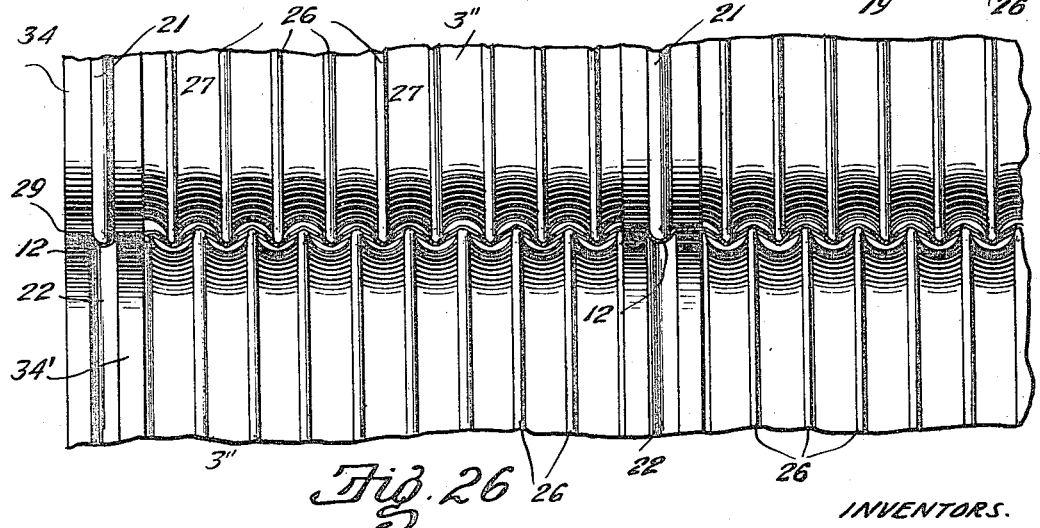

Figure 1 is a plan view of the apparatus;
Fig. 2, a front side elevation of the same;
Fig. 2ª, a fragmentary longitudinal section on the median line, showing the middle or more direct guide bars arched to increase their length;
Fig. 3, a rear side elevation of the same, omitting part of the driving gearing;
Fig. 4, a side elevation showing the ends of the slitting rolls;
Fig. 5, a fragmentary face view of the slitting rolls;
Fig. 6, a plan view of the beaded blank;
Fig. 7, an end view of the same;
Fig. 8, a plan view of the slitted sheet;
Fig. 9, a section of the same on line 9—9, Fig. 8;
Fig. 10, a fragmentary face view of the flattening rolls showing a flattened sheet in section;
Fig. 11, a plan view of a flattened sheet;
Fig. 12, a fragmentary face view of the first corrugating rolls, showing a portion thereof and a corrugated sheet in section;
Fig. 13, a fragmentary enlarged section of the same;
Fig. 14, a plan view of a sheet initially corrugated;
Fig. 15, a fragmentary enlargement of the same;

Fig. 16, a longitudinal section as on line 16—16, Fig. 15;

Fig. 17, a fragmentary face view of the first driving rolls, showing in section the expanding guides and the first partial expansion of the sheet;

Fig. 18, a plan showing first partial expansion of the sheet;

Fig. 19, a fragmentary enlargement of the same;

Fig. 20, a longitudinal section, as on line 20—20, Fig. 19;

Fig. 21, a fragmentary face view of the second corrugating rolls, showing a corrugated sheet in section;

Fig. 22, a fragmentary enlarged section of the same;

Fig. 23, a plan view of a sheet further expanded and again corrugated;

Fig. 24, a fragmentary enlargement of the same;

Fig. 25, a longitudinal section, as on line 25—25, Fig. 24;

Fig. 26, a fragmentary face view of the third corrugating rolls showing a corrugated sheet in section;

Fig. 27, a fragmentary enlarged section of the same;

Fig. 28, a plan view of a sheet further expanded and again corrugated;

Fig. 29, a fragmentary enlargement of the same;

Fig. 30, a longitudinal section, as on line 30—30, Fig. 29;

Fig. 31, a fragmentary face view of the final driving and flattening rolls;

Fig. 32, a plan view of a sheet fully expanded and flattened;

Fig. 33, a fragmentary enlargement of the same;

Fig. 34, a longitudinal section, as on line 34—34, Fig. 33;

Fig. 35, a fragmentary face view of rib forming and mesh flattening rolls;

Fig. 36, a plan view of a sheet fully expanded and flattened with ribs formed therein;

Fig. 37, a fragmentary enlargement of the same; and

Fig. 38, a longitudinal section, as on line 38—38, Fig. 37.

Similar numerals refer to similar parts throughout the drawings.

The apparatus may include slitting rolls 1, strand flattening rolls 2, corrugating rolls 3, 3′ and 3″, driving rolls 4, 4′ and 4″, mesh flattened rolls 5, and ribbing rolls 6; all of which rolls are mounted in a suitable housing 7 and are arranged to be continuously driven at a proper speed by a motor 8 and gearings 9 and 10.

The sheet metal blank 11 shown in Figs. 6 and 7, may be prepared of proper width and with comparatively shallow, laterally spaced, longitudinal guide beads 12 by well known means, preferably separate from the apparatus herein described; and such a sheet may be fed to the slitting rolls over a receiving table 13, and is properly positioned by guides 14 in well known manner.

The slitting rolls 1 may be of any well known type, and as shown are provided with stripper plates 15 mounted between spacer plates 16 in a standard 17. These rolls cut the sheet, in the zones to be expanded between the guide beads, with series of laterally spaced interrupted slits 18, with intervening bonds 19; and the slitting operation usually displaces the strands 20 slightly to one side or the other of the original plane of the sheet, as shown in Fig. 9.

The operation of the slitting rolls drives the sheet forward to the strand flattening rolls 2, which are provided with corresponding ribs 21 and grooves 22 for engaging the beads 12 of the sheet; and the intervening faces 23 of the flattening rolls compress the slitted portion of the sheet, and smooth the strands into the original plane of the sheet, as shown in Figs. 10 and 11.

Parallel guides 24, having corresponding tongues and grooves for engaging the beads 12 of the sheet, may be mounted in a standard 25, to direct the slitted and flattened sheet from the flattening rolls 2 to the first corrugating rolls 3.

The first corrugating rolls 3, like the smoothing rolls 2, are provided with corresponding tongues 21 and grooves 22 for engaging the guide beads 12 and propelling the sheet, and upon the faces of these rolls corresponding to the slitted zones of the sheet, are formed series of annular flanges 26 preferably having V-shaped peripheries which are spaced to impinge the opposite sides of alternate series of the bonds 19 between the interrupted slits 18 of the sheet, so as to form reversely V-shaped corrugations in the alternate series of bonds, and to correspondingly incline the strands, as shown in Figs. 12 to 15.

The peripheries of the flanges may be so proportioned that the angles of one series of corrugated bonds will remain in the original plane of the sheet, while the other series of corrugated bonds and the intervening strands will be deflected from the original plane of the sheet, preferably to the same side on which the beads 12 are formed, as clearly shown in Fig. 13; and the width of the flanges is preferably such that their sides do not overlap, and grooves 27 are preferably provided between adjacent flanges 26 free from contact with the coacting flanges so that the bonds and strands are not compressed between them. The operation of the corrugating flanges not only opens the slits slightly at the sides of each bond, as more clearly shown at 28 in Figs. 13 and 15, but serves to straight stretch the strands by tension and elongate them longitudinally to an extent equal to the increased distance between the deflected bonds.

A preferred novel feature of the improved corrugating method and apparatus is that the corrugating dies are continuous, laterally spaced, annular flanges, which do not cooperate by compression against each other. The width and spacing of the flange dies is such that one die operates against the inner angle portion of a bond or strand, and the opposing dies act against the outer edge portion of the same bond or strand, without much if any overlapping of the faces of the dies, so that the strands are stretched longitudinally at the same time they are inclined laterally to the angle of the corrugations of the bond. The stretching action occurs by the operation of one die deflecting a given bond from the plane of the original sheet, while the next adjacent opposing dies operate to retain the four next adjacent staggered bonds in the plane of the original sheet, as shown in cross section in Figs. 13, 22 and 27, and in longitudinal section in Figs. 16, 25 and 30.

Upon leaving the first corrugating rolls, the beaded strips 29 between the slitted zones of the sheet are engaged by the diverging pair of guide bars 30 which are mounted in standards 31 and extend freely between the upper and lower driving rolls 4 from the first corrugating rolls 3 to the second corrugating rolls 3', with the exception that the guide bars on each side are formed in sections interrupted by the driving disks 32 on the ends of the driving rolls 4. One guide bar of each pair is provided with a groove 33 for receiving the corresponding guide bead 12 of the sheet and the other bar of the same pair abuts the other side of the beaded strip 29 and serves to hold the bead in the groove.

As the sheet is driven forward, the divergence of the guide bars spreads the beaded strips laterally, and thereby expands the slitted and corrugated bonds and stretched strands to form the partially expanded meshes shown in Figs. 18 and 19, and the further expanded meshes shown in Figs. 23 and 24 as the sheet enters the second corrugating rolls 3'. This expansion is permitted by a return of the deflected bonds and a straightening of the stretched strands toward the original plane of the sheet, thus bringing the corrugated bonds and the inclined stands more nearly into the same or common plane; which action may be accompanied by a slight flattening of the corrugated bonds and the corresponding inclination of the strands, thereby reducing the thickness of the expanded meshes to substantially the form shown in the left end of Fig. 20.

The operation of the first driving roll 4 may be limited to the action of the driving disks 32 on the ends thereof which operate on the beaded strips 29, along the edges of the sheet, and are preferably provided with beads 21 and grooves 22 for respectively entering and receiving the guide beads 12 in said strips. The driving disks may be speeded slightly faster than the slitting, smoothing and first corrugating rolls, to compensate for the tendency of the diverging beaded strips on each side edge of the sheet to lag behind the inner strips.

The second corrugating rolls 3' are formed and operate substantially the same as the first corrugating rolls 3, the only difference being an increased lateral spacing between the flange dies to bring them in proper position for operating in the corrugations of the partially expanded bonds and strands.

These rolls operate to deepen the corrugations which have been flattened by the first expansion, by deflecting alternate series of bonds from the plane of the intervening series of bonds, thereby further stretching and elongating the strands by a longitudinal tension to the increased length of the distance between the staggered bond; and this operation may be accompanied by a corresponding increase in the angle of the corrugations and the inclination of the stretched strands, to shape the same in the form shown in Fig. 22.

The second corrugating rolls are also provided with driving disks 34 and 34', having tongues 21 and grooves 22 for engaging the beaded strips 29 of the sheets, and in view of the fact that the divergence of each two side strips from the direct line of the center strip, tends to retard the advancement of the side strips in proportion to such divergence, it is preferred to increase the speed of the driving disks on each side, as compared with the speed of the center disks which operate in the direct line of advance. This difference of speeds may be made by a slightly increasing diameter of each successive side disk in the upper roll, which disks are geared for driving; and by reducing in diameter and mounting the corresponding disks to rotate on the lower roll, so as to freely respond to the increased peripheral speed of the upper disks.

It will be understood that the increased speed described for the end disks on the driving rolls, and the side disks on the second corrugating roll will rather tend to slip, than to increase the speed of the beaded strips, as long as the sheet remains subject to the action of the slitting, smoothing and first corrugating rolls; but just as soon as the rear end of the sheet has cleared these rolls, the differential in the speed of the side driving disks, as compared with the middle line driving disks, will increase the speed of the beaded strips on each side, so as to square the sheet by the time it leaves the final driving disks.

The same result may be and preferably is accomplished by arching the more direct guide bars to make their length approximate or equal the length of the more diverging guide bars, as shown in Fig. 2ᵃ to synchronize the movement of the diverging beads, and in this case, the difference in the speed of the driving disks can be reduced or entirely dispensed with.

Upon leaving the second corrugating rolls, the beaded strips 29 between the slitted zones are again engaged by diverging pairs of guide bars 30', mounted in standards 31' and extending freely between the upper and lower driving rolls 4', from the second corrugating rolls 3' to the third corrugating rolls 3'', in the same manner as described before; and as the sheet is driven forward, the divergence of these guide bars spreads the beaded strips laterally, and expands the slitted and corrugated strands to form wider meshes shown in Figs. 28 and 29, as the sheet enters the third corrugating rolls 3''; which expansion is made in substantially the same manner as described for the first expansion.

The third corrugating rolls 3'' are formed and operate substantially the same as the second corrugating rolls, with a further increase in the lateral spacing between the flange dies to bring them in proper position for operating in the corrugations of the further expanded bonds and strands; and these rolls operate to again deepen the corrugations which have been flattened by the second expansion, and to further stretch and elongate the strands by a longitudinal tension, as before described, the operation being illustrated in Fig. 27.

Upon leaving the third corrugating rolls, the beaded strips 29 between the slitted zones, are again engaged by diverging pairs of guide bars 30'', mounted in standards 31'' and extending freely between the upper and lower driving rolls 4'', from the third corrugating rolls 3'' to the mesh flattening roll 5, in the same manner as described before; and as the sheet is driven forward, the divergence of these guide bars spreads the beaded strips laterally, and expands the slitted and corrugated strands to form the final width of the meshes, and to bring the sheet to its final width as shown in Figs. 36 and 37.

The final expansion is made in substantially the same manner as the two previously described expansions, and results in the formation of an improved form of the secondary type of diamond mesh, in which improved form the corrugated bonds and inclined strands are located in substantially the same common plane, while in the ordinary form the meshes are transversely corrugated. The flattened form of the meshes not only reduces the weight of the metal in a given area, but stiffens and strengthens the sheet, and renders it useful as a reinforcing member as well as a supporting member in concrete construction.

To overcome the tendency of a laterally expanded sheet to shrink in width after it leaves the expanding apparatus, caused no doubt by the resiliency of the angular bends of the corrugated bonds, it is preferred to pass the expanded mesh thus formed, between flattening rolls 5, which may have differential driving disks the same as the second and third corrugating rolls; the faces 35 of which rolls flatten the expanded mesh and set the angles of all the bonds and the corresponding edges of all the strands in the same plane on each side of the mesh, and permanently set all the bonds and strands in the same common plane, as shown in Figs. 31 and 34. The left end of Fig. 34 illustrates the tendency of an expanded sheet to resume a corrugated form, which is prevented by the mesh flattening operation.

Upon leaving the flattening rolls, the beaded strips 29 between the expanded zones of the sheet, are engaged by the parallel pairs of guide bars 36, which extend to the ribbing rolls 6; which rolls may be located a short distance from the flattened rolls, but are preferably located far enough from them, so that they will receive the forward end of the sheet just before the rear end thereof leaves the flattening rolls.

One or more pairs of ribbing rolls with intervening parallel guide bars may be employed, depending upon the depth and shape desired for the ribs; and if the ribs are not too deep, they may be formed from the beads by the use of a single set of rolls having rib forming tongues 37 and grooves 38, as shown in Fig. 35; it being understood that there may be sufficient fullness in the mesh, as the sheet emerges from the previous operations, to permit a further lateral expansion of the same to furnish the necessary material to form ribs of moderate depth.

If deeper ribs are desired, the operation of flattening the mesh may be combined with the formation of the ribs and will supply an additional fullness in the mesh to be taken up by the ribs; in which event the flattening faces of the final driving rolls 5 may be omitted, as shown by broken lines in Fig. 31.

The improvements in expanded metal illustrated and described, but not claimed, herein have been made the subject matter of a divisional application for Letters Patent filed August 22, 1922, Serial No. 583,611.

If yet deeper ribs are desired, an additional set of corrugating and strand stretching rolls may be employed in lieu of the flattening rolls 5, from which additional corrugating rolls the sheet will pass directly to the parallel guides leading to the ribbing rolls, and the formation of the ribs will be accompanied with a further expansion of the meshes as well as a flattening of the same to set them in final form.

I claim:—

1. The method of expanding metal sheets and the like, which includes slitting the sheet to form bonds and strands, then flattening the bonds and strands to the original plane of the sheet, then longitudinally corrugating the bonds, and then expanding the resultant meshes.

2. The method of expanding metal sheets and the like, which includes slitting the sheet to form bonds and strands, then straight stretching the strands to elongate them by tension, and then expanding the resultant meshes.

3. The method of expanding metal sheets and the like, which includes slitting the sheet to form bonds and strands, then longitudinally corrugating and deflecting alternate bonds from a common plane to elongate the strands, and then expanding the resultant meshes.

4. The method of expanding metal sheets and the like, which includes slitting the sheet to form bonds and strands, followed by a series of operations for straight stretching the strands to elongate them by tension, each followed by a lateral expanding of the resultant meshes.

5. The method of expanding metal sheets and the like, which includes slitting the sheet to form bonds and strands, followed by a series of operations for longitudinal corrugating and deflecting alternate bonds from a common plane to elongate the strands, each followed by a lateral expanding of the resultant meshes.

6. The method of expanding metal sheets and the like, which includes slitting the sheet to form bonds and strands, then longitudinally corrugating and deflecting alternate bonds from a common plane to laterally incline and elongate the strands, then laterally expanding the resultant meshes to bring the corrugated bonds and inclined strands toward the same plane.

7. The method of expanding metal sheets and the like, which includes slitting the sheet to form bonds and strands, then longitudinally corrugating and deflecting alternate bonds to laterally inclining and elongate the strands, then laterally expanding the resultant meshes, and then flattening the same to set the corrugated bonds and inclined strands in the same plane.

8. The method of expanding metal sheets and the like, which includes slitting the sheets to form bonds and strands, then longitudinally corrugating and deflecting alternate bonds from a common plane to laterally incline and elongate the strands, then laterally expanding the resultant mesh to bring the corrugated bonds and inclined strands toward the same plane, and then flattening the meshes to set the bonds and strands in the same plane.

9. The method of making ribbed expanded metal from sheets provided with laterally spaced parallel beads, which includes slitting the zones between the beads to form bonds and strands, then straight stretching the strands to elongate them by tension, then expanding the resultant meshes and forming ribs from the beads.

10. The method of making ribbed expanded metal from sheets provided with laterally spaced parallel beads, which includes slitting the zones between the beads to form bonds and strands, then longitudinally corrugating and deflecting alternate bonds from a common plane to laterally incline and elongate the strands, then laterally expanding the resultant meshes to bring the bonds and strands toward the same plane, then forming ribs from the beads and simultaneously flattening the meshes to set the corrugated bonds and inclined strands in the same plane.

11. The method of expanding metal sheets in zones between nonexpanded strips, which includes slitting the zones to form bonds and strands, then straight stretching the strands to elongate them by tension, and then laterally separating the strips to expand the resultant meshes.

12. The method of expanding metal sheets in zones between nonexpanded strips, which includes slitting the zones to form bonds and strands, then longitudinally corrugating and deflecting alternate bonds from a common plane to elongate the strands, and then laterally separating the strips to expand the resultant meshes.

13. The method of expanding metal sheets in zones between nonexpanded strips, which includes slitting the zones to form bonds and strands, followed by a series of operations for straight stretching the strands to elongate them by tension, each followed by a lateral separation of the strips to expand the resultant meshes.

14. The method of expanding metal sheets and the like in zones between nonxepanded strips which includes slitting the zones to form bonds and strands, followed by a series of operations for longitudinally corrugating and deflecting alternate bonds to elongate the strands, each followed by a lateral separation of the strips to expand the resultant meshes.

15. The method of expanding metal sheets and the like in zones between nonexpanded strips, which includes slitting the zones to form bonds and strands, then longitudinally corrugating and deflecting alternate bonds from a common plane to laterally incline and elongate the strands, and then laterally separating the strips to expand the resultant meshes and bring the corrugated bonds and inclined strands toward the same plane.

16. The method of expanding metal sheets and the like in zones between nonexpanded strips which includes slitting the zones to form bonds and strands, then longitudinally corrugating and deflecting alternate bonds from a common plane, then separating the strips to expand the resultant meshes and bring the corrugated bonds and inclined strands toward the same plane, and then flattening the meshes to set the bonds and strands in the same plane.

17. The method of expanding metal sheets and the like in zones between nonexpanded strips, which includes slitting the zones to form bonds and strands, then longitudinally moving and laterally diverging the strips to expand the resultant meshes and synchronizing the longitudinal movements of the strips according to their divergence from a direct line.

18. The method of expanding metal sheets and the like, which consists in slitting the sheet to form parallel strands with staggered connecting bonds, then flattening the strands and bonds to the same plane, then longitudinally corrugating the bonds to laterally incline and straight stretch the strands, and then laterally expanding the meshes to bring the corrugated bonds and inclined strands toward the same plane.

19. The method of expanding metal sheets and the like, which consists in slitting the sheet to form parallel strands with staggered connecting bonds, then flattening the strands and bonds to the same plane, then longitudinally corrugating the bonds to laterally incline and straight stretch the strands, then laterally expanding the meshes to bring the corrugated bonds and inclined strands toward the same plane, and then flattening the expanded mesh to set the bonds and strands in the same plane.

20. The method of expanding and ribbing metal sheets and the like provided with parallel beads, which consists in longitudinally slitting the zones between the beads to form parallel strands with staggered connecting bonds, then flattening the strands and bonds to the same plane, then longitudinally corrugating the bonds to laterally incline and straight stretch the strands, then expanding the meshes by laterally separating the beads to bring the corrugated bonds and inclined strands toward the same plane, and then forming ribs from the beads.

21. The method of expanding and ribbing metal sheets and the like provided with parallel beads, which consists in longitudinally slitting the zones between the beads to form parallel strands with staggered connecting bonds, then flattening the strands and bonds to the same plane, then longitudinally corrugating the bonds to laterally incline and straight stretch the strands, then expanding the meshes by laterally separating the beads to bring the corrugated bonds and inclined strands toward the same plane, and then flattening the meshes to set the bonds and strands in the same plane and forming ribs from the beads.

22. Apparatus for expanding metal sheets and the like including means slitting the sheet to form bonds and strands, means flattening the slit sheet, and means forming and expanding diamond mesh with corrugated bonds from the slit and flattened sheet.

23. Apparatus for expanding metal sheets and the like including means slitting the sheet to form bonds and strands, means corrugating the bonds and elongating the strands, and means laterally deploying the strands and expanding the resultant meshes.

24. Apparatus for expanding metal sheets and the like including means slitting the sheet to form bonds and strands, means corrugating the bonds and inclining and elongating the strands, and means laterally deploying the strands and expanding the resultant meshes.

25. Apparatus for expanding metal sheets and the like including means slitting the sheet to form bonds and strands, means corrugating the bonds and elongating the strands, and means laterally expanding the resultant meshes with the corrugated bonds and the strands in substantially the same plane.

26. Apparatus for expanding metal sheets and the like including means slitting the sheet to form bonds and strands, means corrugating the bonds and inclining the strands, means laterally expanding the resultant meshes, and means flattening the meshes to set the corrugated bonds and inclined strands in the same plane.

27. Apparatus for expanding metal sheets and the like including roller means slitting the sheet to form bonds and strands, roller means flattening the slit sheet, and means corrugating the bonds and laterally deploying the strands and expanding the resultant meshes.

28. Apparatus for expanding metal sheets and the like including roller means slitting the sheet to form bonds and strands, roller means corrugating the bonds and elongating the strands, and means laterally deploying the strands and expanding the resultant meshes.

29. Apparatus for expanding metal sheets and the like including roller means slitting the sheet to form bonds and strands, roller means corrugating the bonds and inclining and elongating the strands, and means laterally deploying the strands and expanding the resultant meshes.

30. Apparatus for expanding metal sheets and the like including roller means slitting the sheet to form bonds and strands, roller means corrugating the bonds and elongating the strands, and means laterally expanding the resultant meshes with the corrugated bonds and the strands in substantially the same plane.

31. Apparatus for expanding metal sheets and the like including roller means slitting the sheet to form bonds and strands, means corrugating the bonds and inclining the strands, means laterally expanding the resultant meshes, and roller means flattening the meshes to set the corrugated bonds and inclined strands in the same plane.

32. Apparatus for expanding metal sheets and the like including means slitting the sheet to form bonds and strands, a series of means corrugating the bonds and elongating the strands, and intervening means successively deploying the strands and expanding the resultant meshes.

33. Apparatus for expanding metal sheets and the like including means slitting the sheet to form bonds and strands, a series of means corrugating the bonds and inclining and elongating the strands, and intervening means successively deploying the strands and expanding the resultant meshes.

34. Apparatus for expanding metal sheets and the like including roller means slitting the sheet to form bonds and strands, a series of roller means corrugating the bonds and inclining and elongating the strands, and intervening means successively deploying the strands and expanding the resultant meshes.

35. Apparatus for expanding metal sheets and the like including means slitting the sheet to form bonds and strands, means corrugating the bonds and inclining the strands, means laterally expanding the resultant meshes with the corrugated bonds and inclined strands in substantially the same plane, and roller means flattening the meshes to set the corrugated bonds and inclined strands in the same plane.

36. Apparatus for expanding and ribbing metal sheets and the like including roller means slitting the sheet to form bonds and strands between nonslitted strips, means corrugating the bonds and inclining the strands, diverging guides separating the strips for laterally expanding the resultant meshes, parallel guides for the strips leading from the expanding means, and roller means ribbing the strips at the end of the parallel guides.

37. Apparatus for expanding metal sheets slit to form parallel strands with staggered bonds, including rolls having laterally spaced annular flange dies for corrugating the bonds and laterally inclining and longitudinally elongating the strands.

38. Apparatus for expanding metal sheets and the like including roller means slitting the sheet between nonslitted strips, means corrugating the bonds and inclining the strands, diverging guides separating the strips for laterally expanding the mesh, and means conveying the strips at different speeds according to their divergence from a direct line.

39. Apparatus for expanding metal sheets and the like provided with parallel beads and slitted zones between the beads, including diverging guides for the beads, and means for moving the beads along the guides for expanding the slitted zones, the more direct guides being arched to synchronize the movement of the beads.

40. Apparatus for expanding metal sheets and the like provided with parallel beads and slitted zones between the beads, including diverging guides for the beads, means for moving the beads along the guides for expanding the slitted zones, and means for synchronizing the movement of the beads.

41. Apparatus for expanding metal sheets and the like including roller means slitting the sheets in zones between non-slitted strips, means expanding the slitted zones of the sheet by longitudinally moving and diverging the strips, and means for synchronizing the movement of the diverging strips.

42. The method of expanding metal sheets and the like in zones between non-expanded strips, which includes the operation of expanding meshes by longitudinally moving panding meshes by longitudinally moving the sheets and laterally diverging the strips, and synchronizing the longitudinal movement of the strips according to their divergence from a direct line.

43. The method of expanding metal sheets which consists in longitudinally slitting zones between spaced nonslitted zones to form strands and bonds, then passing the slitted zones between rolls to elongate the strands, and then separating the nonslitted zones to expand the slitted zones.

HARRY M. NAUGLE.
ARTHUR J. TOWNSEND.